United States Patent

Mendlovic et al.

[11] Patent Number: 5,909,312
[45] Date of Patent: Jun. 1, 1999

[54] PHASE-ONLY FILTER FOR GENERATING AN ARBITRARY ILLUMINATION PATTERN

[75] Inventors: David Mendlovic, Petach Tikva; Emanuel Marom, Tel Aviv; Naim Konforti, Holon; Zeev Zalevsky; Gal Shabtay, both of Petach Tikva, all of Israel

[73] Assignee: Ramot University Authority for Applied Research & Industrial Development Ltd., Tel Aviv, Israel

[21] Appl. No.: 08/942,121

[22] Filed: Oct. 1, 1997

[30] Foreign Application Priority Data

Oct. 2, 1996 [IL] Israel ......................................... 119341

[51] Int. Cl.$^6$ ............................. G02B 5/00; G02B 27/09; G02B 27/42
[52] U.S. Cl. ........................... 359/558; 359/565; 359/569; 359/737
[58] Field of Search .................................... 359/558, 565, 359/569, 737, 708

[56] References Cited

U.S. PATENT DOCUMENTS

| 4,083,627 | 4/1978 | Okano | 359/574 |
|---|---|---|---|
| 4,804,249 | 2/1989 | Reynolds et al. | 359/558 |
| 5,706,139 | 1/1998 | Kelly | 359/565 |

Primary Examiner—Jon W. Henry
Attorney, Agent, or Firm—Mark M. Friedman

[57] ABSTRACT

A phase-only filter for approximating a given optical transfer function for monochromatic incoherent light. The filter is designed by solving an integral equation for a phase function, and imposing, on a transparent plate, an optical path length for the incoherent radiation equal, in radians, to the phase function modulo $2\pi$ plus an overall constant.

18 Claims, 3 Drawing Sheets

PHASE-ONLY FILTER FOR GENERATING AN ARBITRARY ILLUMINATION PATTERN

FIELD AND BACKGROUND OF THE INVENTION

The present invention relates to optical filters and, more particularly, to a phase-only filter that enables the generation of any desired illumination pattern.

A generalized optical system is shown in FIG. 1. Incoherent radiation of wavelength $\lambda$ is provided at an input plane 10, and passes through an imaging system of focal length F, represented schematically by a lens 12, to an output plane 14. Input plane 10 is a distance U from lens 12. Output plane 14 is a distance V from lens 12. The distances U, V, and F satisfy the relationship $$\frac{1}{U} + \frac{1}{V} = \frac{1}{F} \qquad (1)$$

FIG. 1 also shows the Cartesian coordinate system used herein. z is the direction of light propagation. x is perpendicular to z, in the plane of FIG. 1. y is perpendicular to both x and z, and points out of the plane of FIG. 1 at the reader.

The optical system of FIG. 1 is characterized by a coherent transfer function (CTF) $H(f_x, f_y)$ which is related to the aperture transmittance function $P(x,y)$ of lens 12 by the relationship $$H(f_x, f_y) = P(-\lambda V f_x, -\lambda V f_y) \qquad (2)$$

$h(x,y)$, the impulse response of the CTF, is the inverse Fourier transform of the CTF:

$$h(x, y) = \int_{-\infty}^{\infty}\int_{-\infty}^{\infty} H(f_x, f_y)\exp[2\pi i(f_x x + f_y y)]df_x df_y \qquad (3)$$

The optical transfer function (OTF) is the normalized transfer function of the system for incoherent illumination, defined as:

$$\mathcal{H}(f_x, f_y) = \frac{1}{k}\int_{-\infty}^{\infty}\int_{-\infty}^{\infty} |h(x, y)|^2 \exp[-2\pi i(f_x x + f_y y)]dxdy \qquad (4)$$

where the normalizing constant k is:

$$k = \frac{1}{\int_{-\infty}^{\infty}\int_{-\infty}^{\infty} |h(x, y)|^2 dxdy} \qquad (5)$$

See, for example, J. W. Goodman, *Introduction to Fourier Optics*, McGraw-Hill, San Francisco (1968), pp. 102–130; M. J. Beran and G. B. Parrent, *Theory of Partial Coherence*, Prentice-Hall Inc., Englewood Cliffs N.J. (1964); L. Mandel and E. Wolf, "Coherence properties of optical fields", Rev. Mod. Phys. vol. 37 p. 231 (1965); and P. S. Considine, "Effects of coherence on imaging system", J. Opt. Soc. Am. vol. 56 p. 1001 (1996). The output obtained for the case of incoherent illumination is:

$$I_{do}(x, y) = \int_{-\infty}^{\infty}\int_{-\infty}^{\infty} |h(x - x_0, y - y_0)|^2 I_{gi}(x_0, y_0) dx_0 dy_0 \qquad (6)$$

where $I_{do}$ and $I_{gi}$ are the output and input intensities respectively. Equivalently, the OTF of the optical system is the ratio of the Fourier transforms of the output and input intensities:

$$\mathcal{H}(f_x, f_y) = \frac{\mathcal{F}[I_{do}(x, y)]}{\mathcal{F}[I_{gi}(x, y)]} \qquad (7)$$

where "$\mathcal{F}$" represents a Fourier Transform operation.

Using equations (2), (4) and (5), the expression for the OTF may be rewritten $$\mathcal{H}(f_x, f_y) = \frac{\int_{-\infty}^{\infty}\int_{-\infty}^{\infty} P\left(\xi + \frac{1}{2}\lambda V f_x, \eta + \frac{1}{2}\lambda V f_y\right) P^*\left(\xi - \frac{1}{2}\lambda V f_x, \eta - \frac{1}{2}\lambda V f_y\right) d\xi d\eta}{\int_{-\infty}^{\infty}\int_{-\infty}^{\infty} |P(\xi, \eta)|^2 d\xi d\mu} \qquad (8)$$

Equation (8) yields some of the physical properties of the OTF:

$$\mathcal{H}(0, 0) = 1$$

$$\mathcal{H}(-f_x, -f_y) = \mathcal{H}(f_x, f_y)^*$$

$$|\mathcal{H}(f_x, f_y)| \leq \mathcal{H}(0, 0)$$

Given a particular input intensity profile $I_{gi}$ and imaging system, a desired output intensity profile $I_{do}$ can be obtained by putting a suitable filter 16 between lens 12 and output plane 14, as shown in FIG. 2, thereby forcing the optical system to have the corresponding OTF as expressed by equation (7). Filter 16 typically functions by attenuating the light passing through lens 12. Thus, the energy of the output beam is less than the energy of the input beam. This is undesirable in many applications, for example in optical computing, in which many imaging systems may be cascaded, and the intensity of the ultimate output light may be too low to be of practical use. If a non-attenuating, all-phase filter, that would function as a diffractive optical element, could be designed and constructed, the output intensity would be reduced from the input intensity to a smaller extent than is the case with an attenuation filter. In fact, the output intensity would be substantially the same as the input intensity. Devices incorporating such filters would function with essentially no attenuation losses in the filters.

There is thus a widely recognized need for, and it would be highly advantageous to have, a phase only filter corresponding to a desired optical transfer function.

SUMMARY OF THE INVENTION

According to the present invention there is provided a method for making, for an imaging system of aperture (M(u)) at a distance V from an output plane, a phase-only filter for radiation of wavelength $\lambda$ which approximates an optical transfer function $\mathcal{H}$ (f) having a Fourier transform $\chi(\underline{x})$, the phase-only filter being characterized by a phase function w($\underline{u}$) and an impulse response having an intensity $I_h(\underline{x})$, the method comprising the steps of: (a) solving an integral equation $$\cos w(\underline{u}_2) \int d\underline{x}(\chi(\underline{x})-I_h(\underline{x})) \int d\underline{u}_1 M(\underline{u}_1)\sin\Phi = \sin w(\underline{u}_2) \int d\underline{x}(\chi(\underline{x})-I_h(\underline{x})) \int d\underline{u}_1 M(\underline{u}_1)\cos\Phi$$

for w($\underline{u}$), wherein $$\phi = w(\underline{u}_1) + \frac{1}{\lambda V} \underline{x} \cdot (\underline{u}_2 - \underline{u}_1);$$

and (b) establishing, at at least one location in the filter, an optical path length, in radians, through the filter, equal to a constant plus the phase function, modulo $2\pi$, evaluated at the location.

According to the present invention there is provided a method for transforming the intensity profile of a beam of radiation of wavelength $\lambda$, from $I_{gi}(\underline{x})$ to $I_{do}(\underline{x})$, $I_{gi}(\underline{x})$ having a Fourier transform $\mathcal{F}_{gi}(\underline{f})$ and $I_{do}(\underline{u})$ having a Fourier transform $\mathcal{F}_{do}(\underline{f})$, the method comprising the steps of: (a) providing a lens having an aperture M($\underline{u}$) at a distance V from an output plane; (b) solving an integral equation $$\cos w(\underline{u}_2) \int d\underline{x}(\chi(\underline{x})-I_h(\underline{x})) \int d\underline{u}_1 M(\underline{u}_1)\sin\Phi = \sin w(\underline{u}_2) \int d\underline{x}(\chi(\underline{x})-I_h(\underline{x})) \int d\underline{u}_1 M(\underline{u}_1)\cos\Phi$$

for a phase function w($\underline{u}$), wherein $$\phi = w(\underline{u}_1) + \frac{1}{\lambda V} \underline{x} \cdot (\underline{u}_2 - \underline{u}_1),$$

$\chi(\underline{x})$ is a Fourier transform of $\mathcal{F}_{do}(\underline{f})/\mathcal{F}_{gi}(\underline{f})$, and $I_h(\underline{x})$ is an intensity of an impulse response of a phase-only filter function $\exp(iw(\underline{u}))$; and (c) providing a filter having therethrough, at at least one location, an optical path length, in radians, equal to a constant plus the phase function, modulo $2\pi$, evaluated at the location.

According to the present invention there is provided a filter for providing an imaging system of aperture M($\underline{u}$), at a distance V from an output plane, with an optical transfer function approximately equal to $\mathcal{H}(\underline{f})$, for radiation of wavelength $\lambda$, the filter comprising a substantially transparent plate characterized by a laterally varying optical path length therethrough, in radians, equal to a constant plus a phase function w($\underline{u}$) modulo $2\pi$, wherein w($\underline{u}$) is obtained by solving an integral equation $$\cos w(\underline{u}_2) \int d\underline{x}(\chi(\underline{x})-I_h(\underline{x})) \int d\underline{u}_1 M(\underline{u}_1)\sin\Phi = \sin w(\underline{u}_2) \int d\underline{x}(\chi(\underline{x})-I_h(\underline{x})) \int d\underline{u}_1 M(\underline{u}_1)\cos\Phi$$

wherein $\chi(\underline{x})$ is a Fourier transform of $\mathcal{H}(\underline{f})$, $I_h(\underline{x})$ is an intensity of an impulse response of a product of M($\underline{u}$) with a phase-only filter function $\exp(iw(\underline{u}))$, and $$\phi = w(\underline{u}_1) + \frac{1}{\lambda V} \underline{x} \cdot (\underline{u}_2 - \underline{u}_1).$$

The mathematical expression for a phase-only filter is $\exp(iw(u,v))$, where u and v are normalized coordinates of the lens plane of lens 12:

$$u = -\lambda V f_x, \quad v = -\lambda V f_y \qquad (9)$$

If the aperture of lens 12 is M(u,v), the aperture transmittance function P of equation (2) thus becomes $$\underline{P}(u,v) = M(u,v)\exp(iw(u,v)) \qquad (10)$$

The filter is realized by adjusting the optical path length, of radiation of wavelength $\lambda$, in a transparent plate to be w(u,v) radians modulo $2\pi$ plus a constant number of radians. This can be accomplished by varying the refractive index of the plate laterally, or by changing the surface profile of the plate. The surface profile can be changed by adding material to a surface of the plate, for example by photodeposition, or by removing material from a surface of the plate, for example by etching.

The filter of the present invention is designed for a particular wavelength $\lambda$ of radiation, but in practice w(u,v) varies slowly with u and v, so that the filter tends to be insensitive to wavelength variations in the incident radiation.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
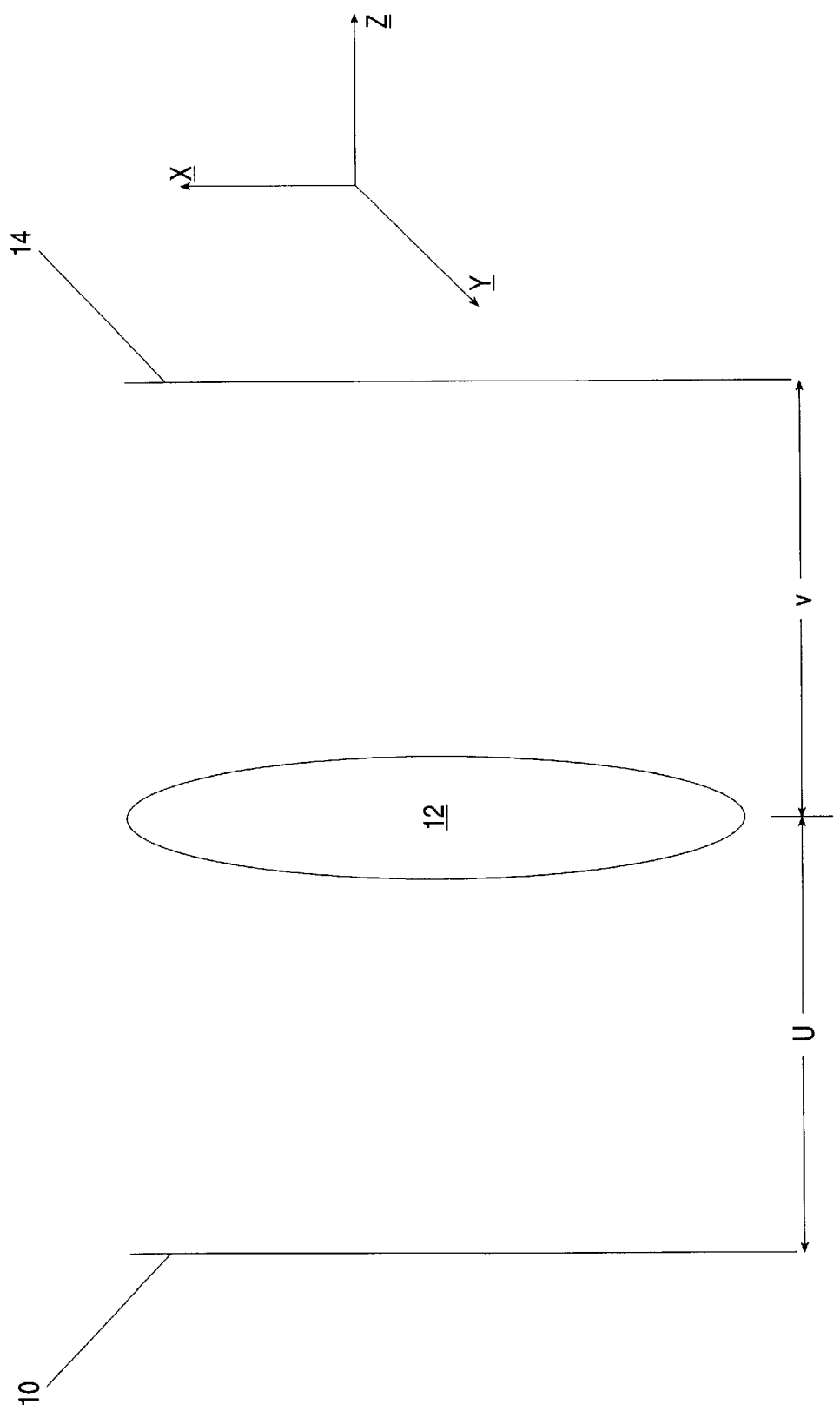
FIG. 1 (prior art) is a schematic diagram of an optical system.

The present invention is of a phase-only optical filter which can be used to shape incoherent radiation with less attenuation than in a phase-and-amplitude filter. Specifically, the present invention can be used to approximate any desired optical transfer function.

The principles and operation of a phase-only filter according to the present invention may be better understood with reference to the drawings and the accompanying description.

The phase function w(u,v) is found by solving an integral equation. For simplicity, the integral equation will be derived in the one dimensional case (dependence on u only). The extension to two dimensions is straightforward.

In one dimension, the desired OTF is denoted by $\mathcal{H}(f_x)$. The aperture of lens 12 is M(u). A phase-only filter $\exp(iw(u))$ is attached to the lens. Thus the aperture transmittance function P becomes:

$$P(u) = M(u)\exp(iw(u)) \qquad (11)$$

The Fourier transform of the OTF is:

$$\chi(x) = \int_{-\infty}^{\infty} \mathcal{H}(f_x)\exp(-ixf_x) df_x \qquad (12)$$

If constant factors are neglected, the intensity of the impulse response of the phase-only filter, $I_h(x)$, is:

$$I_h(x) = \left[\int_{-\infty}^{\infty} M(u)\exp(iw(u))\exp\left(\frac{ix}{\lambda V}u\right)du\right]\left[\int_{-\infty}^{\infty} M(u)\exp(iw(u))\exp\left(\frac{ix}{\lambda V}u\right)du\right]^* \quad (13)$$

$$= \int_{-\infty}^{\infty}\int_{-\infty}^{\infty} M(u_1)M(u_2)\exp\left(w(u_1) - w(u_2) + \frac{x}{\lambda V}u_1 - \frac{x}{\lambda V}u_2\right)du_1 du_2$$

Note that in equation (13) the normalization constant k of equation (5) has been omitted because a constant factor does not affect the shape of the OTF. The OTF obtained according to the present invention may differ from the desired OTF by a constant factor. The mean square error between $\chi(x)$ and $I_h(x)$ is denoted by $\epsilon$:

$$\varepsilon = \int_{-\infty}^{\infty} |\chi(x) - I_h(x)|^2 dx \quad (14)$$

For compactness, $\psi(u_1,u_2,x)$ is defined as:

$$\psi(u_1, u_2, x) = w(u_1) - w(u_2) + \frac{x}{\lambda V}u_1 - \frac{x}{\lambda V}u_2 \quad (15)$$

Using equation (14) it is easily seen that $$\varepsilon = \int_{-\infty}^{\infty} [|\chi(x)|^2 + |I_h(x)|^2 - 2Re\{I_h(x)\chi(x)^*\}]dx \quad (16)$$

$\epsilon$ is minimized using the calculus of variations. In this approach, small variations $\delta_w(u)$ are imposed on the phase function of the filter, $w(u)$:

$$w(u) \rightarrow w(u) + \delta_w(u) \quad (17)$$

The filter $w(u)$ is sought for which $\epsilon$ is independent of $\delta_w(u)$. This is an extremum of $\epsilon$ (in this case a minimum) because the variation is zero. Thus, the filter obtained is the optimal filter in the sense of minimum mean square error. The basic assumption of the calculus of variations is that the phase variations $\delta_w(u)$ are small enough that the variation terms with higher powers ($\delta_w^2, \delta_w^3, \ldots$) are neglected. Under the assumption of the calculus of variation, $$\exp[i(\delta_w(u_1) - \delta_w(u_2))] \approx 1 + i(\delta_w(u_1) - \delta_w(u_2)) \quad (18)$$

Denoting by $I^\delta_h$ the variations caused in $I_h$ by the variations of the filter's phase, and applying the approximation of equation (18) to equation (13), yields:

$$I_h^\delta = \int_{-\infty}^{\infty}\int_{-\infty}^{\infty} M(u_1)M(u_2)\exp(i\psi(u_1, u_2, x))[1 + i(\delta_w(u_1) - \delta_w(u_2))]du_1 du_2 \quad (19)$$

In the most common case, the OTF is real and even.

According to the properties of the Fourier transform, $\chi$ also is real and even. (If the OTF is not real and even, the derivation is similar but more complicated.) Using this assumption and equation (19) to evaluate the various terms of equation (16) gives:

$$Re(I^\delta_h(x)\chi(x) \approx I_h(x)\chi(x) - \chi(x)\int_{-\infty}^{\infty}\int_{-\infty}^{\infty} M(u_1)M(u_2)\sin(\psi(u_1, u_2, x))[\delta_w(u_1) - \delta_w(u_2)]du_1 du_2 \quad (20)$$

$$|I^\delta{}_h(x)|^2 \approx I_h(x)^2 - 2I_h(x)\int_{-\infty}^{\infty}\int_{-\infty}^{\infty}M(u_1)M(u_2)\sin(\psi(u_1,u_2,x))[\delta_w(u_1)-\delta_w(u_2)]du_1du_2 \quad (21)$$

Inserting equation (19) into the error expression of equation (15) gives an expression for the error that includes the variation term $\delta_w$:

$$\epsilon^\delta = \epsilon + \delta_\epsilon \quad (22)$$

$\delta_\epsilon$ is the error term related to the variation $\delta_w$:

$$\delta_\epsilon = 2\int_{-\infty}^{\infty}(\chi(x)-I_h(x))\left[\int_{-\infty}^{\infty}\int_{-\infty}^{\infty}M(u_1)M(u_2)\sin(\psi(u_1,u_2,x))\delta_w(u_1)du_1du_2 - \int_{-\infty}^{\infty}\int_{-\infty}^{\infty}M(u_1)M(u_2)\sin(\psi(u_1,u_2,x))\delta_w(u_2)du_1du_2\right]dx \quad (23)$$

(Note that $\epsilon$ is independent of $\delta_w$.) Because, according to equation (15), $$\psi(u_1,u_2,x) = -\psi(u_2,u_1,x) \quad (24)$$

interchanging the integration variables $u_1$ and $u_2$ in equation (21) allows equation (21) to be rewritten as:

$$\delta_\epsilon = 4\int_{-\infty}^{\infty}(\chi(x)-I_h(x))\left[\int_{-\infty}^{\infty}\int_{-\infty}^{\infty}M(u_1)M(u_2)\sin(\psi(u_1,u_2,x))\delta_w(u_2)du_1du_2\right]dx \quad (25)$$

Changing the order of the integration in equation (25) gives:

$$\delta_\epsilon = 4\int_{-\infty}^{\infty}M(u_2)\delta_w(u_2)du_2\left[\int_{-\infty}^{\infty}\int_{-\infty}^{\infty}(\chi(x)-I_h(x))M(u_1)\sin(\psi(u_1,u_2,x))du_1dx\right] \quad (26)$$

For the optimal phase-only filter, the right hand side of equation (24) must be identically zero for all $\delta_w$. Thus, the integrand of the double integral in brackets, which is a function of $u_2$, must be identically zero for any value of $u_2$. The phase $w(u_2)$ that makes that integrand identically zero is the phase of the optimal phase-only filter. Using the trigonometric identity $$\sin\left[\left(w(u_1)-\frac{x}{\lambda V}u_2+\frac{x}{\lambda V}u_1\right)-w(u_2)\right] = \quad (27)$$

$$\sin\left(w(u_1)-\frac{x}{\lambda V}u_2+\frac{x}{\lambda V}u_1\right)\cos w(u_2) -$$

$$\cos\left(w(u_1)-\frac{x}{\lambda V}u_2+\frac{x}{\lambda V}u_1\right)\sin w(u_2)$$

gives $$\cos w(u_2)\int_{-\infty}^{\infty}\int_{-\infty}^{\infty}(\chi(x)-I_h(x))M(u_1)\sin\phi du_1 dx = \quad (28)$$

$$\sin w(u_2)\int_{-\infty}^{\infty}\int_{-\infty}^{\infty}(\chi(x)-I_h(x))M(u_1)\cos\phi du_1 dx$$

where $$\phi = w(u_1) - \frac{x}{\lambda V}u_2 + \frac{x}{\lambda V}u_1.$$

Equation (28) is equivalent to the following equation:

$$\tan w(u_2) = \frac{\int_{-\infty}^{\infty}\int_{-\infty}^{\infty}(\chi(x)-I_h(x))M(u_1)\sin\phi du_1 dx}{\int_{-\infty}^{\infty}\int_{-\infty}^{\infty}(\chi(x)-I_h(x))M(u_1)\cos\phi du_1 dx} \quad (29)$$

This equation may be solved iteratively for the function w as follows:
1. Assume an arbitrary initial w.
2. Calculate $I_h$ using equation (13).
3. Get a new w using equation (29).
4. If the procedure has not converged, return to step 2.

This is the simplest algorithm for solving for w. Other faster and more accurate algorithms are known in the art. See, for example, the descriptions of the Steffenson algorithm, the Newton-Raphson method, and the Secant algorithm in E. Isaacson and H. B. Keller, *Analysis of Numerical Methods*, Wiley, N.Y. (1966).

In the numerical iterative solution of equation (29), additional considerations must be taken into account. The OTF is designed by its shape. Therefore, the designed OTF may differ from the desired OTF by a constant factor. If this factor is not taken into account, the iterative solution does not converge. To achieve convergence, the constant factor is introduced into the minimization of $\epsilon$ in the form of another variable, c, multiplying $I_h$, and $\epsilon$ is minimized with respect to both $\delta_w$ and c. The new form of equation (16) is:

$$\varepsilon = \int_{-\infty}^{\infty} [|\chi(x)|^2 + c^2|I_h(x)|^2 - 2Re\{cI_h(x)\chi(x)^*\}]dx \quad (30)$$

Setting the derivative of the integrand of the right hand side of equation (30) with respect to c equal to zero gives the value of c that minimizes $\varepsilon$:

$$c = \frac{\int_{-\infty}^{\infty} Re\{I_h(x)\chi(x)^*\}dx}{\int_{-\infty}^{\infty} |I_h(x)|^2 dx} \quad (31)$$

and equation (29) becomes:

$$\tan w(u_2) = \frac{\int_{-\infty}^{\infty}\int_{-\infty}^{\infty}(\chi(x) - cI_h(x))M(u_1)\sin\phi du_1 dx}{\int_{-\infty}^{\infty}\int_{-\infty}^{\infty}(\chi(x) - cI_h(x))M(u_1)\cos\phi du_1 dx} \quad (32)$$

The generalization of equation (28) to two dimensions is straightforward. The scalar distance x becomes a distance vector (x,y); the scalar distance u becomes a distance vector (u,v); and the scalar wavenumber $f_x$ becomes a wavenumber vector $(f_x, f_y)$. The double integrals in equations (28) and (29) become quadruple integrals. The function $\Phi$ in the integrand becomes:

$$(xu_2 + yv_2 - xu_1 - yv_1)/\lambda V \quad (33)$$

Using vectorial notation, equation (28) and the expression for $\Phi$ can be generalized to a form that includes both the one dimensional case and the two dimensional case:

$$\cos w(\underline{u}_2)\int d\underline{x}(\chi(\underline{x}) - I_h(\underline{x}))\int d\underline{u}_1 M(\underline{u}_1)\sin\phi = \quad (34)$$
$$\sin w(\underline{u}_2)\int d\underline{x}(\chi(\underline{x}) - I_h(\underline{x}))\int d\underline{u}_1 M(\underline{u}_1)\cos\phi$$

$$\phi = w(\underline{u}_1) + \frac{1}{\lambda V}\underline{x}\cdot(\underline{u}_2 - \underline{u}_1)$$

In the one dimensional case, the integration variables $\underline{x}$, $\underline{u}_1$, and $\underline{u}_2$ are the scalar distances x, $u_1$, and $u_2$; the integrals with respect to $\underline{x}$ and $\underline{u}_1$ are single integrals from negative infinity to infinity; and the dot between $\underline{x}$ and $(\underline{u}_2 - \underline{u}_1)$ in the expression for $\Phi$ represents scalar multiplication. In the two dimensional case, the integration variables $\underline{x}$, $\underline{u}_1$, and $\underline{u}_2$ are the distance vectors (x,y), $(u_1,v_1)$ and $(u_2,v_2)$, respectively; the integrals are double integrals from negative infinity to infinity; and the dot between $\underline{x}$ and $(\underline{u}_2 - \underline{u}_1)$ in the expression for $\Phi$ represents a vectorial inner product.

Figure 2:
FIG. 2 (prior art) is a schematic diagram of the optical system of FIG. 1 including a filter.
Figure 2:
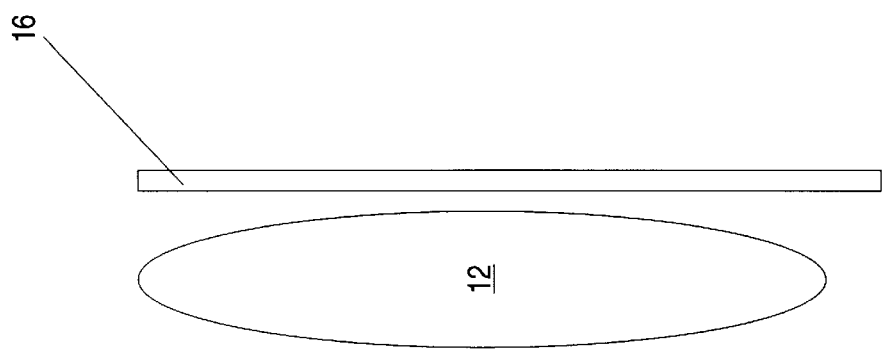
Figure 2:
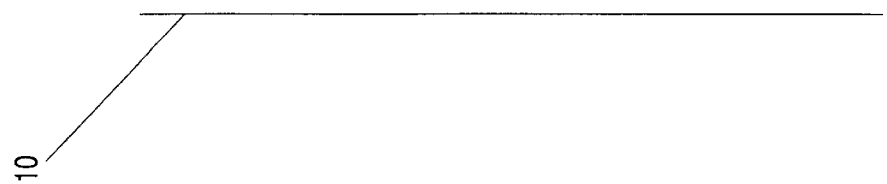
Figure 3:
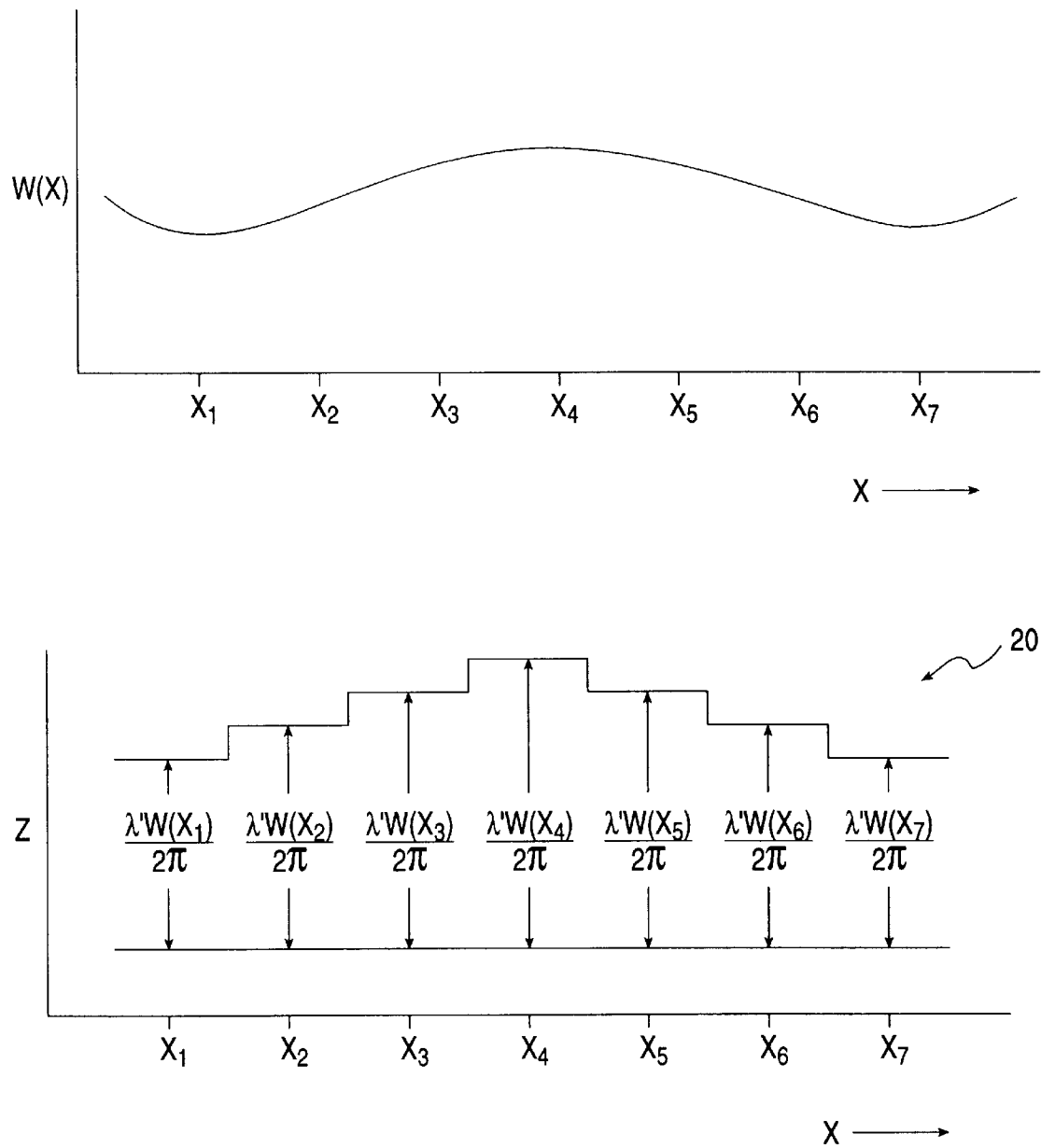
FIG. 3 is a schematic cross section through a phase only filter.

Referring now to the drawings, FIG. 3 shows a cross section in the x-direction through a portion of a phase-only filter 20 according to the present invention. The top portion of FIG. 3 shows a graph of w(x) as a function of x. Filter 20 is fabricated in a plate of transparent material having an index of refraction such that the wavelength of the incoherent radiation within the plate is $\lambda'$ (generally not the same as $\lambda$), by making the thickness of the plate equal, in wavelengths, to $w(x)/2\pi$ at a plurality of sampling points $x_j$. FIG. 3 shows filter 20 at seven such sampling points, $x_1$ through $x_7$. The thickness in the z-direction (the direction of light propogation) are $\lambda'w(x_1)/2\pi$ through $\lambda'w(x_7)/2\pi$, as shown. As noted in the summary, the function w is determined up to a multiple of $2\pi$ and up to an overall constant for the entire filter 20, so that the thickness of filter 20 at point $x_j$ more generally can be expressed as $\lambda'w(x_j)/2\pi + a_j\lambda' + b$, where $a_j$ is an integer that may depend on index j and b is an overall constant distance. The profile of filter 20 between sampling points $x_j$ need not be stepped as shown in FIG. 3, although a stepped profile such as shown is easier to fabricate than a continuous profile. In general, the profile of filter 20 also varies in the y-direction, perpendicular to the plane of FIG. 3, in accordance with the variation of w in the y-direction. Filter 20 may be given the variable thickness thereof by a variety of techniques well-known in the art, for example photodeposition and etching. In use, filter 20 is simply substituted for filter 16 of FIG. 2.

Alternatively, filter 20 may be a plate of transparent material of laterally varying index of refraction, with the index of refraction made to vary such that at a lateral coordinate (x,y), the optical path length of the incoherent radiation in the z-direction is substantially equal to w(x,y) modulo $2\pi$ radians, up to an overall constant. This laterally varying index of refraction may be imposed on the plate by methods well-known in the art, for example, ion beam implantation.

While the invention has been described with respect to a limited number of embodiments, it will be appreciated that many variations, modifications and other applications of the invention may be made.

What is claimed is:

1. A method for making, for an imaging system of aperture $M(\underline{u})$ at a distance V from an output plane, a phase-only filter for radiation of wavelength $\lambda$ which approximates an optical transfer function $\mathcal{H}(\underline{f})$ having a Fourier transform $\chi(\underline{x})$, the phase-only filter being characterized by a phase function $w(\underline{u})$ and an impulse response having an intensity $I_h(\underline{x})$, the method comprising the steps of:

(a) solving an integral equation $$\cos w(\underline{u}_2)\int d\underline{x}(\chi(\underline{x})-I_h(\underline{x}))\int d\underline{u}_1 M(\underline{u}_1)\sin\Phi = \sin w(\underline{u}_2)\int d\underline{x}(\chi(\underline{x})-I_h(\underline{x}))\int d\underline{u}_1 M(\underline{u}_1)\cos\Phi$$

for $w(\underline{u})$, wherein $$\phi = w(\underline{u}_1) + \frac{1}{\lambda V}\underline{x}\cdot(\underline{u}_2 - \underline{u}_1);$$

and (b) establishing, at a plurality of locations in the filter, an optical path length, in radians, through the filter, equal to a constant plus the phase function, modulo $2\pi$, evaluated at said location.

2. The method of claim 1, wherein said integral equation is solved iteratively.

3. The method of claim 1, wherein said establishing of said optical path length is effected by varying a refractive index of the filter.

4. The method of claim 1, wherein said establishing of said optical path length is effected by altering a surface profile of the filter.

5. The method of claim 4, wherein said alteration is effected by photodeposition.

6. The method of claim 4, wherein said alteration is effected by etching.

7. A method for transforming the intensity profile of a beam of radiation of wavelength $\lambda$, from $I_{gi}(\underline{x})$ to $I_{do}(\underline{x})$, $I_{gi}(\underline{x})$ having a Fourier transform $\mathcal{F}_{gi}(\underline{f})$ and $I_{do}(\underline{u})$ having a Fourier transform $\mathcal{F}_{do}(\underline{f})$, the method comprising the steps of:

(a) providing a lens having an aperture $M(\underline{u})$ at a distance V from an output plane;

(b) solving an integral equation $$\cos w(\underline{u}_2) \int d\underline{x}(\chi(\underline{x})-I_h(\underline{x})) \int d\underline{u}_1 M(\underline{u}_1)\sin\Phi = \sin w(\underline{u}_2) \int d\underline{x}(\chi(\underline{x})-I_h(\underline{x})) \int d\underline{u}_1 M(\underline{u}_1)\cos\Phi$$

for a phase function $w(\underline{u})$, wherein $$\phi = w(\underline{u}_1) + \frac{1}{\lambda V}\underline{x}\cdot(\underline{u}_2 - \underline{u}_1),$$

$\chi(\underline{x})$ is a Fourier transform of $\mathcal{F}_{do}(\underline{f})/\mathcal{F}_{gi}(\underline{f})$, and $I_h(\underline{x})$ is an intensity of an impulse response of a phase-only filter function $\exp(iw(\underline{u}))$; and (c) providing a filter having therethrough, at a plurality of locations, an optical path length, in radians, equal to a constant plus said phase function, modulo $2\pi$, evaluated at said location.

8. The method of claim 7, wherein said integral equation is solved iteratively.

9. The method of claim 7, wherein said optical path length is provided by varying a refractive index of said filter.

10. The method of claim 7, wherein said optical path length is provided by altering a surface profile of said filter.

11. The method of claim 10, wherein said alteration is effected by photodeposition.

12. The method of claim 10, wherein said alteration is effected by etching.

13. A filter for providing an imaging system of aperture $M(\underline{u})$, at a distance V from an output plane, with an optical transfer function approximately equal to $\mathcal{H}(\underline{f})$, for radiation of wavelength $\lambda$, the filter comprising a substantially transparent plate characterized by a laterally varying optical path length therethrough, in radians, equal to a constant plus a phase function $w(\underline{u})$ modulo $2\pi$, wherein $w(\underline{u})$ is obtained by solving an integral equation $$\cos w(\underline{u}_2)\int d\underline{x}(\chi(\underline{x})-I_h(\underline{x}))\int d\underline{u}_1 M(\underline{u}_1)\sin\Phi = \sin w(\underline{u}_2)\int d\underline{x}(\chi(\underline{x})-I_h(\underline{x}))\int d\underline{u}_1 M(\underline{u}_1)\cos\Phi$$

wherein $\chi(\underline{x})$ is a Fourier transform of $\mathcal{H}(\underline{f})$, $I_h(\underline{x})$ is an intensity of an impulse response of a product of $M(\underline{u})$ with a phase-only filter function $\exp(iw(\underline{u}))$, and $$\phi = w(\underline{u}_1) + \frac{1}{\lambda V}\underline{x}\cdot(\underline{u}_2 - \underline{u}_1).$$

14. The filter of claim 13, wherein said integral equation is solved iteratively.

15. The filter of claim 13, wherein said optical path length is provided by varying a refractive index of the plate.

16. The filter of claim 13, wherein said optical path length is provided by varying a thickness of the plate.

17. The filter of claim 16, wherein said variation is effected by photodeposition.

18. The filter of claim 16, wherein said variation is effected by etching.

* * * * *